(12) United States Patent
Jung

(10) Patent No.: US 11,410,193 B2
(45) Date of Patent: Aug. 9, 2022

(54) METHOD FOR PROVIDING ADVERTISEMENT AND SERVER THEREFOR

(71) Applicant: Firstface Co., Ltd., Seoul (KR)

(72) Inventor: Jae Lark Jung, Goyang-si (KR)

(73) Assignee: Firstface Co., Ltd., Seoul (KR)

( * ) Notice: Subject to any disclaimer, the term of this patent is extended or adjusted under 35 U.S.C. 154(b) by 438 days.

(21) Appl. No.: 15/863,454

(22) Filed: Jan. 5, 2018

(65) Prior Publication Data

US 2018/0130082 A1    May 10, 2018

Related U.S. Application Data

(63) Continuation of application No. 14/762,244, filed as application No. PCT/KR2014/000370 on Jan. 13, 2014, now abandoned.

(30) Foreign Application Priority Data

Jan. 21, 2013    (KR) .......................... 10-2013-0006391

(51) Int. Cl.
    *G06Q 30/02*    (2012.01)
(52) U.S. Cl.
    CPC ..... *G06Q 30/0214* (2013.01); *G06Q 30/0207* (2013.01); *G06Q 30/0241* (2013.01);
    (Continued)
(58) Field of Classification Search
    CPC ........... G06Q 30/0241; G06Q 30/0261; G06Q 20/10; G06Q 50/01; G06Q 50/34;
    (Continued)

(56) References Cited

U.S. PATENT DOCUMENTS

2003/0006911 A1*  1/2003  Smith .................. G08G 1/20
                                                    340/988
2005/0078177 A1    4/2005  Gotanda
                   (Continued)

FOREIGN PATENT DOCUMENTS

CN    1366643 A    8/2002
CN    1510622 A    7/2004
          (Continued)

OTHER PUBLICATIONS

International Search Report in International Application No. PCT/KR2014/000370, filed Jan. 13, 2014.

*Primary Examiner* — Chinyere Mpamugo
(74) *Attorney, Agent, or Firm* — Saliwanchik, Lloyd & Eisenschenk

(57)    ABSTRACT

According to one example of the present invention, provided is a method for allowing an advertisement-providing server connected to a user terminal to provide an advertisement through an advertisement-providing application installed on the user terminal, the method comprising the steps of: (a) receiving, from the user terminal, an activation-requesting signal for making a request to change the state of a display part of the user terminal from being off to being on; (b) providing the advertisement to the display part according to the activation-requesting signal; (c) receiving, from the user terminal to which the advertisement is provided, an advertisement content-requesting signal for making a request to provide advertisement content associated with the advertisement; (d) if receiving the advertisement content-requesting signal, providing the advertisement content to the user terminal; and (e) accumulating, for the user terminal, a first reward according to the activation-requesting signal and a second reward according to the advertisement content-requesting signal.

9 Claims, 4 Drawing Sheets

(52) U.S. Cl.
CPC ..... *G06Q 30/0262* (2013.01); *G06Q 30/0267* (2013.01); *G06Q 30/0273* (2013.01)

(58) Field of Classification Search
CPC ............... G06Q 20/3223; G06Q 20/36; G06Q 2230/00; G06Q 30/00; G06Q 30/0203; G06Q 30/0245; G06Q 30/0252; G06Q 30/0267; G06Q 30/0277; G06Q 10/00; G06Q 10/06; G06Q 10/083; G06Q 10/0833; G06Q 10/0837; G06Q 20/0658; G06Q 20/108; G06Q 20/12; G06Q 20/145; G06Q 20/20; G06Q 20/227; G06Q 20/28; G06Q 20/29; G06Q 20/322; G06Q 20/3224; G06Q 20/325; G06Q 20/3276; G06Q 20/3278; G06Q 20/367; G06Q 20/3676; G06Q 30/0201; G06Q 30/0202; G06Q 30/0217; G06Q 30/0226; G06Q 30/0238; G06Q 30/0242; G06Q 30/0246; G06Q 30/0249; G06Q 30/0253; G06Q 30/0256; G06Q 30/0257; G06Q 30/0259; G06Q 30/0271; G06Q 30/0272; G06Q 30/0273; G06Q 30/06; G06Q 30/0621; G06Q 30/0631; G06Q 30/0641; G06Q 40/02; G06Q 50/12; G06Q 50/20; G06Q 50/22; G06Q 50/30; G06Q 30/0262; G06Q 30/0214; G06Q 40/00; G06Q 30/0269; G06Q 10/10; G06Q 30/0251; G06Q 30/02; G06Q 30/0207–277; H04W 4/21; H04W 4/02; H04W 4/029; H04W 4/80; H04W 4/021; H04W 12/00; H04W 4/23; H04W 12/08; H04W 12/0804; H04W 4/023; H04W 4/08; H04W 4/10; H04W 4/12; H04W 4/18; H04W 4/30; H04W 4/50; H04W 76/11; H04W 76/45; H04W 8/186; H04W 68/005; H04W 52/0212; H04W 52/0258; H04W 52/0277; H04W 72/0493; H04W 84/12; H04W 88/02; H04W 28/0284; H04W 28/06; H04W 68/02; H04W 76/22; H04W 28/02; H04W 28/18; H04W 4/14

See application file for complete search history.

(56) References Cited

U.S. PATENT DOCUMENTS

| | | |
|---|---|---|
| 2005/0192861 A1 | 9/2005 | Nakazawa et al. |
| 2008/0046921 A1* | 2/2008 | Fujimaki ............... G06Q 30/02 725/34 |
| 2008/0281940 A1 | 11/2008 | Coxhill |
| 2010/0035589 A1* | 2/2010 | Wormaid ............... H04L 67/36 455/414.1 |
| 2012/0198113 A1 | 8/2012 | Ziarnik et al. |
| 2013/0111408 A1* | 5/2013 | Berus ..................... G06Q 10/10 715/835 |
| 2013/0185368 A1* | 7/2013 | Nordstrom ........... H04L 69/329 709/206 |
| 2014/0019253 A1* | 1/2014 | Ricasata ........... G06Q 30/0241 705/14.64 |
| 2014/0114737 A1* | 4/2014 | Espejo ............... G06Q 30/0207 705/14.27 |
| 2014/0297417 A1* | 10/2014 | Cusack ................. G06Q 30/02 705/14.61 |

FOREIGN PATENT DOCUMENTS

| | | |
|---|---|---|
| CN | 1606049 A | 4/2005 |
| CN | 102572737 A | 7/2012 |
| EP | 1434153 A1 | 6/2004 |
| JP | 2000-315958 A | 11/2000 |
| JP | 2002-099812 A | 4/2002 |
| JP | 2005-115099 A | 4/2005 |
| JP | 2007-102423 A | 4/2007 |
| JP | 2007-159072 A | 6/2007 |
| JP | 2007-249358 A | 9/2007 |
| JP | 2008-234669 A | 10/2008 |
| JP | 2011-203391 A | 10/2011 |
| KR | 10-1999-0078840 A | 11/1999 |
| KR | 10-2001-0088221 A | 9/2001 |
| KR | 10-2005-0108869 A | 11/2005 |
| KR | 10-0746902 B1 | 8/2007 |
| KR | 10-2008-0111177 A | 12/2008 |
| KR | 10-2009-0058131 A | 6/2009 |
| KR | 10-2009-0117255 A | 11/2009 |
| KR | 10-2010-0057461 A | 5/2010 |
| KR | 10-1102852 B1 | 1/2012 |
| KR | 10-2012-0100497 A | 9/2012 |
| WO | WO-2006/051971 A1 | 5/2006 |

* cited by examiner ion Ser.
METHOD FOR PROVIDING ADVERTISEMENT AND SERVER THEREFOR

CROSS-REFERENCE TO RELATED APPLICATIONS

This application is a continuation of U.S. application Ser. No. 14/762,244, filed Jul. 21, 2015; which is the U.S. national stage application of International Patent Application No. PCT/KR2014/000370, filed Jan. 13, 2014; which claims priority to Korean Application No. 10-2013-0006391, filed Jan. 21, 2013, the disclosures of each of which are incorporated herein by reference in their entirety.

TECHNICAL FIELD

The present invention relates to a method for providing an advertisement and a server for providing an advertisement, and more particularly, to a method and server for providing an advertisement, which may provide an advertisement to a user terminal when an activation-requesting signal is input to the user terminal.

BACKGROUND ART

With the increase in the spread of smart terminals, the smart terminal has become a necessity for modern life. The smart terminal has been utilized in most areas of life, such as searching for a variety of information, appreciating content media such as music and videos, talking with acquaintances, paying the price of goods, and the like as well as making a call using the smart terminal.

As the smart terminal is utilized in most areas of life in this manner, a user may habitually perform an operation of activating a display unit of the smart terminal at the time of movement or standby while carrying the smart terminal. However, only an image and time information designated by the user may be exposed on the display unit of the smart terminal activated through such an operation, and no specific function may be executed or no specific information may be provided.

In order to execute a variety of functions provided by most smart terminals, any operation should be performed in a state in which the terminal is activated, that is, in a state in which the display unit is turned on, and therefore an operation of activating the terminal is a necessary operation for the execution of the terminal's functions.

In addition, with the increase in the spread of smart terminals, the types and methods of advertisements utilizing such smart terminals are also increasing, and thereby the frequency of advertisement exposure to the user naturally increases.

In particular, a method for providing an advertisement through an application of the smart terminal is becoming highly popular, in which an application for providing an advertisement to the smart terminal may be generally installed, and the installed application is driven to provide the advertisement to the smart terminal.

In the case of such an application for providing the advertisement, it is necessary to execute the corresponding application and to perform a separate operation for playing an advertisement, and other operations using the smart terminal cannot be performed while viewing the advertisement.

DISCLOSURE

Technical Problem

The present invention is directed to providing a method and server for providing an advertisement, which may provide an advertisement to a user terminal only through a user's operation of pressing an activation button on a display unit of the user terminal.

The present invention is also directed to providing a method and server for providing an advertisement, which may provide a different advertisement according to time information to a user terminal, so that marketing in units of hours or minutes is made possible.

The present invention is also directed to providing a method and server for providing an advertisement, which may share rewards accumulated to a user with the user's acquaintances when an advertisement is provided to a user terminal, so that it is possible to increase a bond with the user's acquaintances.

Technical Solution

One aspect of the present invention provides a method for allowing an advertisement-providing server connected to a user terminal to provide an advertisement through an advertisement-providing application installed on the user terminal, the method including the steps of: (a) receiving, from the user terminal, an activation-requesting signal for making a request to change the state of a display unit of the user terminal from being off to being on; (b) providing the advertisement to the display unit according to the activation-requesting signal; (c) receiving, from the user terminal to which the advertisement is provided, an advertisement content-requesting signal for making a request to provide advertisement content associated with the advertisement; (d) providing the advertisement content to the user terminal, when receiving the advertisement content-requesting signal; and (e) accumulating, for the user terminal, a reward according to the advertisement content-requesting signal. Also, a reward according to the activation-requesting signal may be provided.

The step of (a) receiving may include the step of receiving, from the user terminal, time information indicating a time when the activation-requesting signal is input to the user terminal, together with the activation-requesting signal. In this instance, the step of (b) providing may include the step of providing an advertisement corresponding to the time information to the display unit according to the activation-requesting signal, and the step of (d) providing may include the step of transmitting advertisement content corresponding to the time information to the user terminal, when the advertisement content-requesting signal is received.

Before the step of (a) receiving, the method may further include the step of: receiving, from the user terminal, selection information about one or more categories among a plurality of categories included in a category list provided to the user terminal by the advertisement-providing server, wherein the advertisement and the advertisement content which are provided to the user terminal become different according to the selection information about the one or more categories. The advertisement content-requesting signal may be either a click signal regarding the advertisement provided to the display unit or a lock release-requesting signal regarding the user terminal, and when the advertisement content-requesting signal is the lock release-requesting signal, the step of (d) providing may include the step of providing the advertisement content to a standby screen of the user terminal which is unlocked.

The method may further include the step of: transmitting the reward accumulated for the user terminal to a terminal of one or more acquaintances designated by the user terminal, and sharing the transmitted reward.

Another aspect of the present invention provides a server for providing an advertisement, including: a first reception unit that receives, from a user terminal, an activation-requesting signal for making a request to change the state of a display unit of the user terminal from being off to being on; an advertisement-providing unit that provides an advertisement to the display unit according to the activation-requesting signal; a second reception unit that receives, from the user terminal, an advertisement content-requesting signal for making a request to provide advertisement content associated with the advertisement; an advertisement content-providing unit that provides the advertisement content to the user terminal, when receiving the advertisement content-requesting signal; and a reward-providing unit that accumulates, for the user terminal, a reward according to the advertisement content-requesting signal. Also, a reward according to the activation-requesting signal may be provided.

The first reception unit may receive, from the user terminal, time information indicating a time when the activation-requesting signal is input to the user terminal. In this instance, the advertisement-providing unit may provide an advertisement corresponding to the time information to the display unit, according to the activation-requesting signal, and the advertisement content-providing unit may provide advertisement content corresponding to the time information to the user terminal, according to the advertisement content-requesting signal.

The server may further include a third reception unit that receives, from the user terminal, selection information about one or more categories among a plurality of categories included in a category list provided to the user terminal by the server, wherein the advertisement and the advertisement content which are provided to the user terminal become different according to the selection information about the one or more categories.

The advertisement content-requesting signal may be either a click signal regarding the advertisement provided to the display unit or a lock release-requesting signal regarding the user terminal, and when the advertisement content-requesting signal is the lock release-requesting signal regarding the user terminal, the advertisement content-providing unit may provide the advertisement content to a standby screen in of the user terminal which is unlocked.

The server may further include a reward sharing unit that transmits the reward accumulated for the user terminal to a terminal of one or more acquaintances designated by the user terminal, and shares the transmitted reward.

Still another aspect of the present invention provides another method for allowing an advertisement-providing server connected to a user terminal to provide an advertisement through an advertisement-providing application installed on the user terminal, and a computer-readable recording medium that records a computer program for performing such a method.

Advantageous Effects

According to an embodiment of the present invention, a user can view an advertisement by simply pressing an activation button even without separately executing an application.

Also, according to an embodiment of the present invention, a user can receive an advertisement which varies depending on time information in units of minutes.

Also, according to an embodiment of the present invention, a user can receive an advertisement customized to a user according to user's selection information so that the user does not view advertisements in which the user is not interested, thereby saving the user's time.

Also, according to an embodiment of the present invention, a user may give or contribute provided rewards to user's acquaintances so that a bond with the acquaintances can be increased.

MODES OF THE INVENTION

Figure 1:
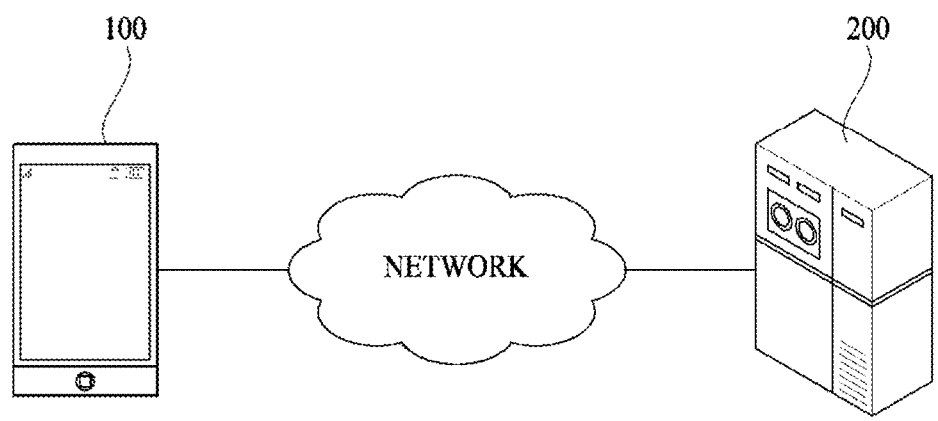
FIG. 1 is a schematic diagram illustrating the configuration of a system for providing an advertisement according to an embodiment of the present invention.

Example embodiments of the present invention are disclosed herein. However, specific structural and functional details disclosed herein are merely representative for purposes of describing example embodiments of the present invention, and thus, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Hereinafter, embodiments of the present invention will be described in detail with the accompanying drawings.

With reference to FIG. 1, a system for providing an advertisement according to an embodiment of the present invention will be described in detail. FIG. 1 is a schematic diagram illustrating the configuration of a system for providing an advertisement according to an embodiment of the present invention.

The system for providing the advertisement according to an embodiment of the present invention may include a user terminal 100 and an advertisement-providing server 200.

The user terminal 100 may be connected to the advertisement-providing server 200 through a network, and receive a variety of advertisements from the advertisement-providing server 200 through an advertisement-providing application installed in the user terminal 100.

The user terminal 100 may perform communication with an external object such as an advertisement-providing server that provides an application through a network, a carrier server, and the like. The network may be a wireless communication network, which is based on a mobile communication scheme such as Wi-Fi (Wireless Fidelity), 3G, Wibro (Wireless Broadband), or the like.

According to an embodiment of the present invention, the user terminal 100 may be a smart device that can communicate with an external server through a network, such as a smart phone, a tablet PC, a PDA, etc.

In the user terminal 100, an advertisement-providing application may be installed in order to receive an advertisement provided by the advertisement-providing server 200. The advertisement-providing application may be provided from the advertisement-providing server 200.

A user may input an activation-requesting signal to the user terminal 100 in which the advertisement-providing application is installed, and thereby receive an advertisement from the advertisement-providing server 200 without a separate additional requesting procedure.

The activation-requesting signal in the present specification may be a signal for making a request to change the state of the user terminal 100 to being activated, and more specifically, denote a signal for making a request to change the state of a display unit of the user terminal 100 from being off to being on. The "activated state" refers to a case in which a display screen of the terminal is turned on, irrespective of what type of information is displayed on the display screen which is turned on. For example, even when only a lock screen is displayed, this may be referred to as the "activated state" of the terminal.

According to an embodiment of the present invention, when receiving the activation-requesting signal from the user terminal 100, the advertisement-providing server 200 may extract an advertisement stored in the advertisement-providing server 200, and transmit the extracted advertisement to the activated display unit of the user terminal 100. In addition, the advertisement may be transmitted in advance from the advertisement-providing server 200 to be temporarily stored, and the stored advertisement may be output to the display unit when the activation-requesting signal is received. In this instance, the advertisement provided to the activated display unit may include various types of advertisements such as a specific image advertisement of a brand desired to be advertised, a video advertisement of goods desired to be advertised, and the like. In addition, a screen provided with an advertisement may include an emergency telephone input unit. Thus, it is possible to immediately make an emergency call in an emergency, for example, to contact the fire department, the police department, or the like.

The advertisement transmitted to the user terminal 100 may be provided in consideration of user's preference or emotional state, according to category selection information which is selected in advance by the user terminal 10 through the application installed in the user terminal 100 by the advertisement-providing server 200.

In a case in which the advertisement-providing server 200 provides the advertisement to the display unit of the user terminal 100, the advertisement-providing server 200 may provide advertisement content associated with the corresponding advertisement when receiving a request to provide the advertisement content associated with the advertisement from the user terminal 100.

The request to provide the advertisement content may be either a click signal regarding the advertisement provided to the user terminal 100 or a lock release-requesting signal regarding the user terminal 100.

The advertisement content in the present specification may be a variety of contents associated with the advertisement provided to the user terminal 100 according to the activation-requesting signal, and include detailed information about an advertised item, promotional information of an advertised brand, a web page of an advertised brand, a web page for the purchase of an advertised item, and the like. Here, the advertisement content is not limited as long as it is content generated in association with the advertisement.

As described above, when a user clicks on the advertisement provided to the user terminal 100, or when a lock release-requesting signal is input to the user terminal 100 to which the advertisement is provided, the advertisement content associated with the advertisement may be provided to the user terminal 100.

When the request to provide the advertisement content is made through the lock release-requesting signal, the user terminal 100 may be unlocked, and the advertisement content may be provided to the unlocked screen of the user terminal 100, but according to an embodiment, the unlocked screen may be a standby screen of the user terminal 100.

The advertisement and the advertisement content which are provided to the user terminal 100 may vary depending on the category selection information which has been received in advance from the user terminal 100 as described above, but also may vary depending on time information of the moment that the user terminal 100 detects the activation-requesting signal.

For example, when the time at the moment that the activation-requesting signal is input to the user terminal 100 is 11:11, an advertisement and advertisement content associated with a Pepero day may be provided, and when the time at the moment that the activation-requesting signal is input to the user terminal 100 is 8:15, a campaign advertisement and advertisement content associated with Dokdo protection may be provided.

In addition, when the activation-requesting signal is received from the user terminal 100 at the time which is notified in advance to the user terminal 100 by the advertisement-providing server 200, various benefits may be provided to a user.

In this manner, information about the activation-requesting signal input time that determines the advertisement and the advertisement content which are provided to the user terminal 100 may be set in advance in the advertisement-providing server 200, or set by an advertiser that has created the corresponding advertisement and advertisement content. In this instance, the advertisement and the advertisement content which are to be provided at the corresponding time may be stored to correspond to the time information.

When a user transmits an advertisement content-requesting signal to the advertisement-providing server 200 while being interested in the advertisement provided to the user terminal 100, the advertisement-providing server 200 may accumulate rewards in the form of points with respect to the user. Obviously, the rewards may be accumulated even with respect to the user terminal 100 that has received only the advertisement through the input of the activation-requesting signal.

The user may select a predetermined number of contacts among acquaintances included in a contact list of the user terminal 100, transmit a part of the rewards accumulated for the user terminal 100 to an acquaintance's terminal corresponding to a selected contact to provide the transmitted part of the rewards. In addition, when charities rather than the acquaintances included in the contact list of the user are selected as being an object to share with, the rewards accumulated to the user may be used as a contribution.

In this manner, according to an embodiment of the present invention, the advertisement may be provided according to the activation-requesting signal input to the user terminal 100, and a differentiated advertisement may be provided according to the time information when the activation-requesting signal is input, the category selection information of the user, and the like, thereby increasing the effect of the advertisement.

Figure 2:
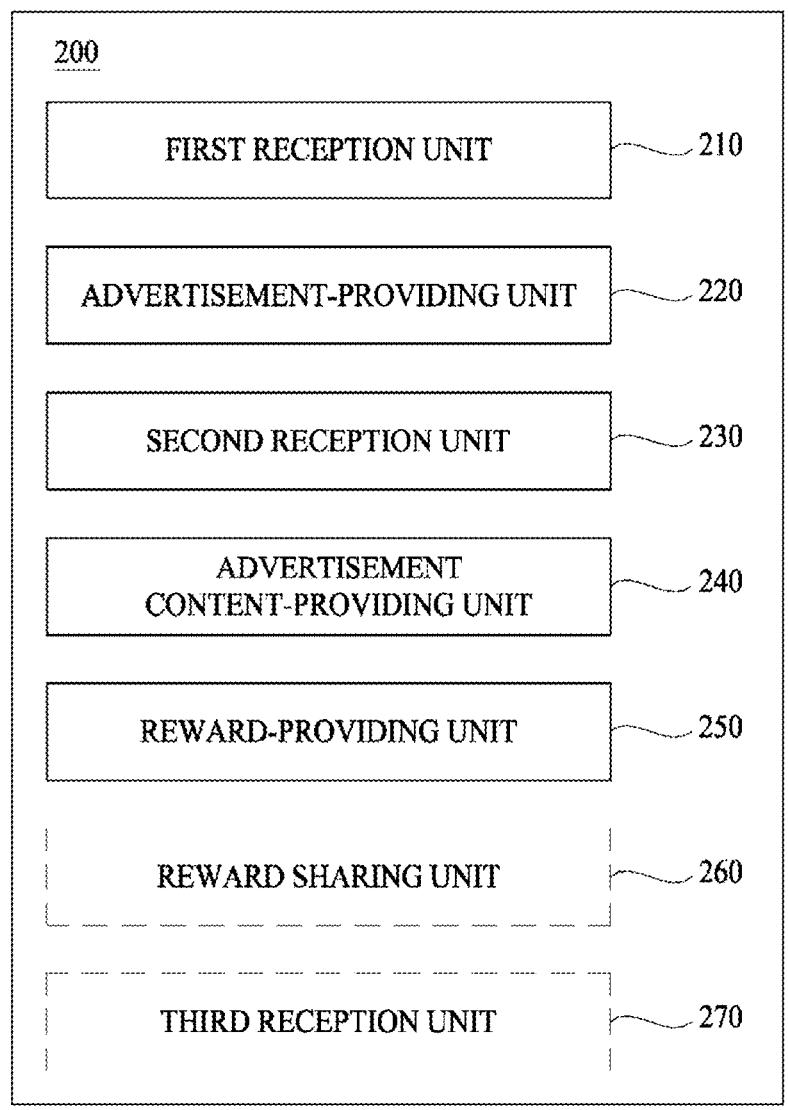
FIG. 2 illustrates the configuration of an advertisement-providing server according to an embodiment of the present invention.

Hereinafter, with reference to FIG. 2, the configuration of an advertisement-providing server according to an embodiment of the present invention will be described. FIG. 2 illustrates the configuration of an advertisement-providing server according to an embodiment of the present invention.

The advertisement-providing server 200 according to an embodiment of the present invention may include a first reception unit 210, an advertisement-providing unit 220, a second reception unit 230, an advertisement content-providing unit 240, a reward-providing unit 250, a reward-sharing unit 260, and a third reception unit 270.

The first reception unit 210 receives an activation-requesting signal from the user terminal 100. The activation-requesting signal may be a signal for making a request to change the state of the display unit of the user terminal 100 from being off to being on, and when the activation-requesting signal is input to the user terminal 100, the user terminal 100 may transmit the activation-requesting signal to the first reception unit 210 of the advertisement-providing server 200.

The state of the display unit of the user terminal 100 may be changed from being off to being on according to the activation-requesting signal, and the advertisement-providing unit 220 included in the advertisement-providing server 200 that has received the activation-requesting signal may provide an advertisement to the activated display unit of the user terminal 100.

According to an embodiment, the first reception unit 210 may receive time information about a time when the activation-requesting signal is input to the user terminal 100, together with the activation-requesting signal.

The user terminal 100 may generate the time information of the moment that the activation-requesting signal is input to the user terminal 100, and transmit the generated time information to the first reception unit 210 together with the activation-requesting signal. In the present specification, the time information refers to information indicating the time at the moment that the activation-requesting signal is input to the user terminal 100.

In this manner, when the first reception unit 210 receives the time information together with the activation-requesting signal, the advertisement-providing unit 220 may provide an advertisement corresponding to the time information to the user terminal 100. In addition, when the advertisement content-providing unit 240 to be described below provides advertisement content to the user terminal 100, advertisement content corresponding to the time information may be provided to the user terminal 100.

The advertisement and the advertisement content corresponding to the time information may refer to an advertisement and advertisement content which are set to be provided from the advertisement-providing server 200 to the user terminal 100 when specific time information is received, and the advertisement and the advertisement content which are set to be provided from the advertisement-providing server 200 to the user terminal 100 at the set time, that is, at the corresponding time may be provided. Alternatively, an advertisement or advertisement content which is set to be provided at the time set by an advertiser's terminal connected to the advertisement-providing server 200 may be provided to the user terminal 100.

In this manner, the advertisement and the advertisement content which are provided to the user terminal 100 may vary according to the time information which the first reception unit 210 receives.

For example, when the first reception unit 210 receives the time information indicating 8:15 together with the activation-requesting signal, the advertisement-providing unit 220 and the advertisement content-providing unit 240 may provide, to the user terminal 100, an advertisement or advertisement content of a brand that provides promotional information associated with Independence Day, for example, 'Dokdo protection project'. In addition, when the time information received together with the activation-requesting signal is '11:11', an advertisement or advertisement content associated with bar cookies may be provided to the user terminal 100.

The second reception unit 230 may receive, from the user terminal 100 to which an advertisement is provided, an advertisement content-requesting signal for making a request to provide advertisement content associated with the advertisement, and the advertisement content-requesting signal may be either a click signal regarding the advertisement provided to the user terminal 100 or a lock release-requesting signal regarding the user terminal 100. The advertisement content-providing unit 240 may transmit advertisement content associated with the advertisement to the user terminal 100, when the second reception unit 230 receives the advertisement content-requesting signal.

The advertisement content which is content associated with the advertisement is content created in association with an item or a brand associated with the advertisement, and may include detailed information about an advertised item, promotional information of an advertised brand, a web page of an advertised brand, and a web page for the purchase of an advertised item.

When the advertisement content-requesting signal which the second reception unit 230 has received is the click signal regarding the advertisement, the advertisement content-providing unit 240 may provide advertisement content to the display unit to which the advertisement is provided, and when the advertisement content-requesting signal is the lock release-requesting signal, the user terminal 100 may be unlocked, and the advertisement content may be provided to the standby screen of the user terminal which is unlocked.

The advertisement content provided from the advertisement content-providing unit 240 to the user terminal 100 may vary according to the time information as described above.

According to an embodiment, when the activation-requesting signal is received at a specific time set in advance by the advertisement-providing server 200, notice information indicating that a specific event is to occur may be provided to the user terminal 100. When the activation-requesting signal is received from the user terminal 100 at the specific time which is actually notified to the user terminal 100 through the notice information, an advertisement and advertisement content corresponding to the specific time information may be provided to the user terminal 100, and benefits such as points, a discount coupon, or the like may be provided to the user terminal 100.

For example, when the advertisement-providing server 200 transmits, to the user terminal 100, a message indicating "we will lead you to a new world on January 27th, at 1:15" in the form of a push message or the like to heighten the expectations of users, and actually receives the activation-requesting signal from the user terminal 100 on January 27th, at 1:15, the advertisement-providing server 200 may provide an advertisement and discount information about a specific item or an image advertisement of a specific brand to the user terminal 100, so that marketing according to time information in units of minutes is made possible in a variety of forms, such as a promotion of contribution of an advertiser of a specific brand to charities according to the number of the user terminals 100 to which the corresponding advertisement is provided, that is, the number of the activation-requesting signals which the advertisement-providing server 200 receives on January 27th, at 1:15.

With respect to the activation-requesting signal and the advertisement content-requesting signal which the first reception unit 210 and the second reception unit 230 have received, the reward-providing unit 250 may accumulate a reward for the user terminal 100. In this instance, a numerical value of a first reward accumulated according to the activation-requesting signal and a numerical value of a second reward accumulated according to the advertisement content-requesting signal may be different from each other. According to an embodiment, the numerical value of the second reward may be larger than the numerical value of the first reward.

The reward accumulated with respect to the user terminal 100 may be used as cash in online shopping malls provided by the advertisement-providing server 200 or affiliates. In addition, a user may give the reward accumulated with respect to the user terminal 100 to acquaintances designated by the user, or contribute the reward to a specific charity. The type of the reward is not limited to cash, and may include card points, game points, and the like. For example, an advertisement of a card company may be output to the display unit through an application provided by the card company, and card points as the corresponding reward may be provided, so that the provided reward may be used in the affiliates of the card company.

The reward-sharing unit 260 may transmit the reward accumulated with respect to the user terminal to a terminal corresponding to the contact designated by the user terminal 100, and share the accumulated reward.

When a user selects and designates a contact of an acquaintance with which the user desires to share his/her own reward among the contacts of the user terminal 100, the corresponding reward may be transmitted to a terminal corresponding to the acquaintance designated by the user. In this instance, the number of acquaintances with which the user can share the reward may be limited to a predetermined number by the advertisement-providing server 200, and when desiring to share the reward with the predetermined number of acquaintances determined by the advertisement-providing server 200, the user may purchase a license for sharing the reward with the acquaintances using the reward or cash accumulated by the user himself/herself.

The user terminal 100 may contribute the reward to a specific charity through a simple process for designating any one of a charity (sponsor) list provided by the advertisement-providing server 200 rather than the acquaintances included in the contact.

The third reception unit 270 may receive, from the user terminal 100, category selection information about one or more categories among a plurality of categories included in a category list provided to the user terminal 100, and the category selection information received from the user terminal 100 may be used when determining the types of the advertisement and the advertisement content which are to be provided to the user terminal 100 in the future.

According to an embodiment, the advertisement and the advertisement content may be classified for each of the plurality of categories, and stored in the advertisement-providing server 200.

The category list including the plurality of categories may be information obtained by classifying the type of business of the advertiser that provides the advertisement and the advertisement content, information obtained by classifying the advertisement and the advertisement content according to the user's emotional states or interests, or information obtained by classifying the advertisement and the advertisement content for each specific color.

For example, the plurality of categories included in the category list may be "restaurant industry, fashion industry, shoe industry, automobile industry, communication industry, and so on", "fashion beauty, reading, travel, employment, dating, and so on", "depression, joy, despair, sadness, happiness, and so on", or "red, blue, yellow, white, and so on".

The user may select one or more categories among a plurality of categories included in a category list provided to the user terminal 100. Here, the third reception unit 270 may receive such category selection information, and the advertisement-providing unit 220 and the advertisement content-providing unit 240 may provide, to the user terminal 100, an advertisement and advertisement content suitable for the received category selection information.

When receiving the advertisement and the advertisement content from the advertiser, the advertisement-providing server 200 may receive advertiser setting information indicating that the advertiser's advertisement and advertisement content are provided according to the type of the category selection information, and store the received advertiser setting information in association with the advertisement and the advertisement content. When the third reception unit 270 receives the category selection information, the advertisement and the advertisement content according to the category selection information may be provided to the user terminal 100.

Obviously, the advertisement and the advertisement content stored directly by the advertisement-providing server may be classified according to a plurality of pieces of category information, and the advertisement and the advertisement content may be stored together with the classified category information.

In this manner, according to an embodiment of the present invention, the third reception unit 270 may receive the category selection information from the user terminal 100, and provide the advertisement and the advertisement content selected according to the category selection information to the user terminal 100, and therefore the advertisement and the advertisement content in consideration of a user's preference may be provided, thereby further increasing the advertisement effect.

Hereinafter, with reference to FIGS. 3 and 4, a method for providing an advertisement according to another embodiment of the present invention will be described.

Figure 3:
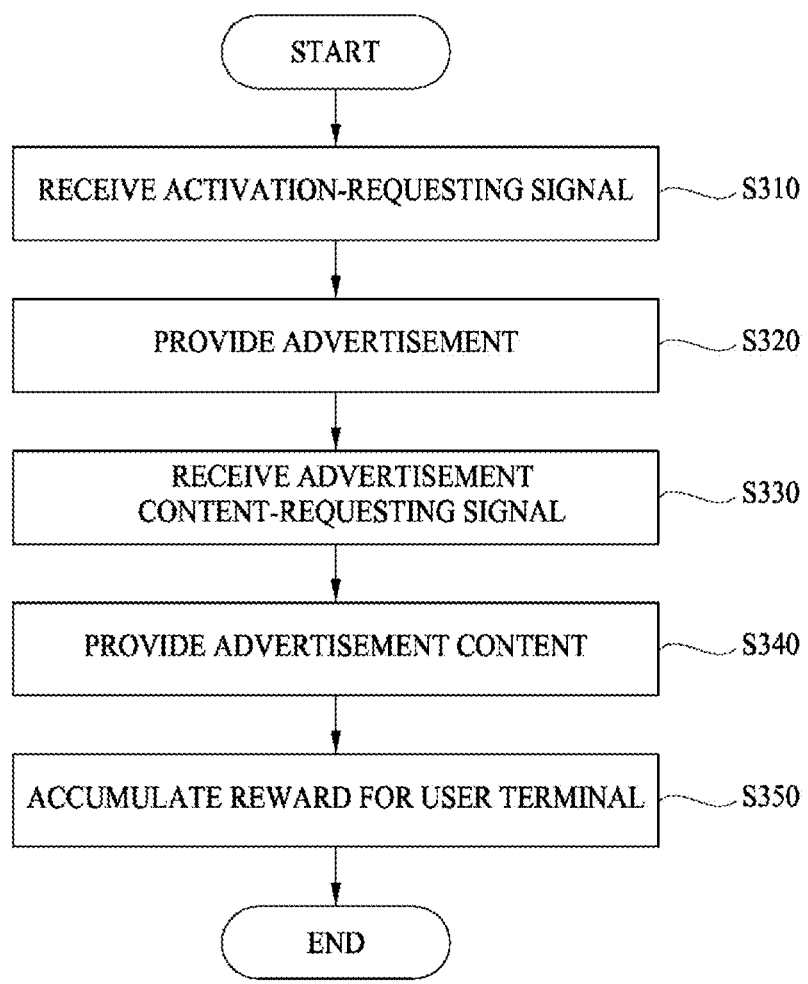
FIG. 3 is a flowchart illustrating a method for providing an advertisement according to another embodiment of the present invention.
Figure 4:
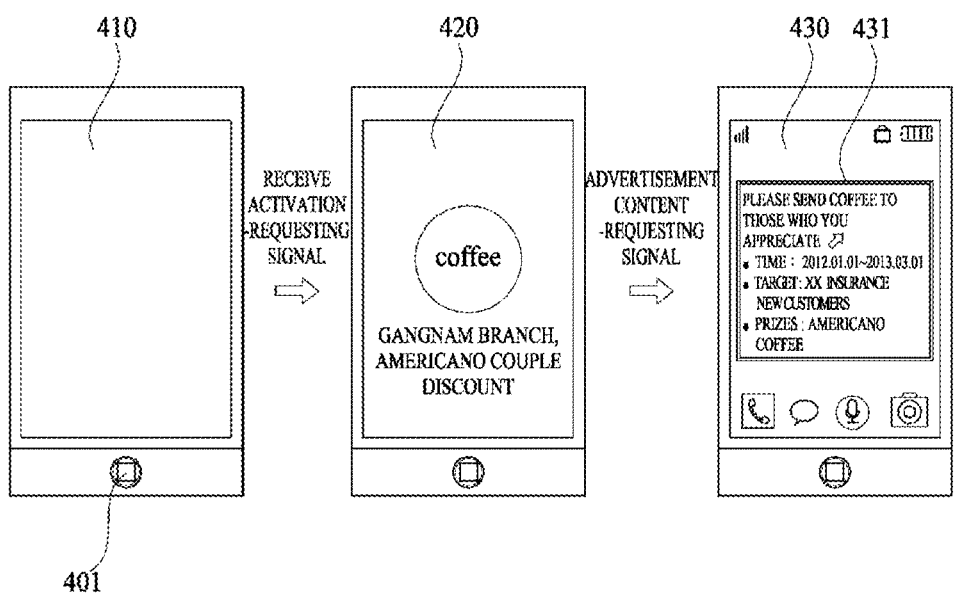
FIG. 4 illustrates an example of a state in which an advertisement is provided to a user terminal by a method for providing an advertisement according to another embodiment of the present invention.

FIG. 3 is a flowchart illustrating a method for providing an advertisement according to another embodiment of the present invention, and FIG. 4 illustrates an example of a state in which an advertisement is provided to a user terminal by a method for providing an advertisement according to another embodiment of the present invention.

In operation S310, the advertisement-providing server 200 receives an activation-requesting signal from the user terminal 100. The activation-requesting signal is a signal for making a request to change the state of the display unit from being off to being on, and when the activation-requesting signal is input to the user terminal 100, the state of the display unit of the user terminal 100 may be changed from being off to being on.

In a case in which the display unit is in an off state 410 as shown in the user terminal of FIG. 4, the activation-requesting signal may be transmitted from the user terminal 100 to the advertisement-providing server 200, when pressing an activation requesting button 401 of the user terminal 100.

The advertisement-providing server 200 may receive time information indicating the time when the activation-requesting signal is input to the user terminal 100, together with the activation-requesting signal. Here, an advertisement and advertisement content to be provided to the user terminal 100, which will be described below, may vary according to the received time information.

In operation S320, when receiving the activation-requesting signal, the advertisement-providing server 200 provides an advertisement to a display unit 420 of the user terminal. As shown in FIG. 4, the state of the display unit 420 of the user terminal may be changed from being off to being on according to the activation-requesting signal, and an advertisement of a specific brand may be provided to the display unit 420 which is in the on state. In this instance, the advertisement provided to the user terminal 100 may be a simple type of advertisement including only a symbol of a brand desired to be advertised and a simple copy.

When receiving an advertisement content-requesting signal from the user terminal 100 to which the advertisement is provided in operation S330, the advertisement-providing server 200 may provide advertisement content 431 to the user terminal 100 in operation S340.

The advertisement content 431 may include detailed information about an item associated with the advertisement, promotional information of an advertised brand, a web page of an advertised brand, a web page for the purchase of an advertised item, and the like. Here, the advertisement content is not limited as long as it is content generated in association with the advertisement.

In this manner, the advertisement content 431 may be content including more detailed information than the advertisement, and when a user views the advertisement provided to the user terminal 100 and desires to take a more active action such as making a request to provide more detailed information about the advertisement or purchasing an advertised item or a brand due to the user's increased interest in the item or the brand, the user may transmit the advertisement content-requesting signal to the advertisement-providing server 200.

The advertisement content-requesting signal may be either a click signal regarding the advertisement provided to the user terminal 100 or a lock release-requesting signal regarding the user terminal 100.

In the case in which the advertisement content-requesting signal is the click signal regarding the advertisement, a user who views the advertisement provided to the user terminal 100 may transmit the advertisement content-requesting signal to the advertisement-providing server 200 by clicking on a screen of the provided advertisement, when desiring to make a request to provide the advertisement content.

In this instance, in the case in which the user does not want the provision of the advertisement content other than the advertisement, when a command signal for a function desired to be performed by the user terminal 100 is input to the user terminal 100, the advertisement-providing server 200 may stop the provision of the advertisement content, and the user terminal 100 may perform an operation corresponding to the command signal input to the user terminal 100. In addition, when a signal for making a request to stop the provision of the advertisement is separately set, such as in an operation of inputting the activation-requesting signal to the user terminal 100 during the provision of the advertisement or inputting the lock release-requesting signal, the user terminal 100 may transmit the activation-requesting signal or the lock release-requesting signal to the advertisement-providing server 200 during the provision of the advertisement, and thereby make the request to stop the provision of the advertisement.

In the case in which the advertisement content-requesting signal is the lock release-requesting signal as shown in FIG. 4, as the lock release-requesting signal is input to the user terminal 100, the user terminal 100 may be unlocked, and the advertisement content 431 may be provided to a standby screen 430 of the user terminal 100 which is unlocked.

In this case, a user who does not want the provision of the advertisement content may request to stop the provision of the advertisement from the advertisement-providing server 200 through a separate operation such as clicking on the advertisement or re-inputting the activation-requesting signal.

In this manner, according to the present invention, a user may selectively transmit the advertisement content-requesting signal to the advertisement-providing server 200 by the user's will only in the case of wanting the provision of the advertisement content, rather than indiscriminately receiving the provision of the advertisement, and may thereby receive the provision of the corresponding advertisement content, so that the user's fatigue caused by the provision of the advertisement may be reduced.

The advertisement and the advertisement content which are provided to the user terminal 100 may vary depending on the category selection information transmitted in advance to the advertisement-providing server 200 by the user terminal and the time information about a time when the activation-requesting signal is received.

In the case in which an advertiser sets, with respect to specific time information, in advance an advertisement and advertisement content which are to be transmitted to the user terminal 100 when receiving specific time information, the advertisement-providing server 200 may determine whether the time information about a time when the activation-requesting signal is received from the user terminal 100 coincides with the time information set by the advertiser, and provide an advertisement and advertisement content equivalent to the corresponding time information to the user terminal 100 when the time information coincides with the time information set by the advertiser.

For example, in a case in which an advertiser sets "10:04" as a time when an advertisement a and advertisement content b of the advertiser's own brand are provided, the advertisement-providing server 200 may provide the advertisement a to the user terminal 100 when a time when receiving the activation-requesting signal from the user terminal 100 is "10:04", and provide the advertisement content b to the user terminal 100 when receiving the advertisement content-requesting signal from the user terminal 100 to which the advertisement a is provided.

In addition, as a user installs an application for receiving the provision of the advertisement and the advertisement content in the user terminal 100 and performs user information registration in order to execute the application, the user may select one or more categories among a plurality of categories included in a category list provided from the advertisement-providing server 200 to the user terminal 100. Here, the types of the advertisement and the advertisement content which are to be provided to the user terminal 100 may be determined according to such category selection information.

The category selection information may refer to selection information with respect to one or more categories among the plurality of categories included in the category list, and an advertisement and advertisement content corresponding to the category according to the category selection information may be provided to the user terminal.

According to an embodiment, the advertisement and the advertisement content may be classified for each of the plurality of categories and stored in the advertisement-providing server 200.

The category list including the plurality of categories may include category information obtained by classifying the type of business of an advertiser that provides the advertisement and the advertisement content, information obtained by classifying the advertisement and the advertisement content according to the user's emotional states or interests, or information obtained by classifying the advertisement and the advertisement content for each specific color.

In operation S350, the advertisement-providing server 200 may accumulate a reward with respect to the user terminal 100 to which the advertisement and the advertisement content are provided. Specifically, in operation S350, a first reward according to the activation-requesting signal and a second reward according to the advertisement content-requesting signal may be accumulated, but obviously, the first reward may be provided to the user terminal 100 to which only the advertisement is provided.

When the accumulated reward is a predetermined numerical value or larger, the reward may be converted into cash and deposited into the user's account, or may be used when a user purchases goods or gets a discount in an online shopping mall operated by the advertisement-providing server 200, affiliates, or the like.

When desiring to transmit a part of the accumulated reward to acquaintances to provide the transmitted reward to the acquaintances, a user may select the contact information of the acquaintance with whom the user desires to share the reward out of the contact information included in the user terminal 100, and transmit the reward having a predetermined numerical value to a terminal corresponding to the selected contact information to share the reward.

When a user selects any one of sponsors included in a sponsor list provided by the advertisement-providing server 200, rather than the acquaintance's contact, and requests to share the reward, the reward having a numerical value set by the user may be contributed to the corresponding sponsor.

The number of acquaintances with whom the transmitted reward is shared may be basically limited, and when desiring to transmit the reward to a predetermined number of acquaintances or larger, it is necessary for a user to purchase a license for sharing the reward provided by the advertisement-providing server 200 so as to share the reward. Thus, the acquaintances who have received the reward from the user terminal 100 may give more meaning to the reward sharing, and therefore it may be useful in the formation of bonds between the acquaintances.

The embodiments of the present invention may be implemented in the form of program instructions that can be executed through various computer means and recorded in a computer-readable medium. The computer-readable medium may separately include program instructions, data files, data structures, etc. or include a combination of them. The program command recorded in the computer-readable medium may be specially designed and configured for the present invention, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program instructions may include high-level language codes executable by a computer using an interpreter, etc. as well as machine language codes made by compilers. The hardware device may be configured to be operated as at least one software module so as to perform the operations according to the embodiments of the present invention, and vice versa.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An advertisement providing system comprising:
an advertisement providing application configured to be installed in a user terminal; and
an advertisement providing server configured to provide an advertisement through the advertisement providing application installed in the user terminal,
wherein the advertisement providing application is configured to transmit a category selection information selected through the advertisement providing application to the advertisement providing server,
wherein the advertisement providing application is configured to display the advertisement received from the advertisement providing server on a display of the user terminal if the user terminal receives an activation request input without requiring a separate additional requesting procedure, the activation request input being to turn on the display of the user terminal when received while the display of the user terminal is turned off,
wherein the advertisement providing server is configured to receive the advertisement to be displayed on the display of the user terminal from an advertiser,
wherein the advertisement providing server is configured to store the received advertisement from the advertiser in relation with a category information,
wherein the advertisement providing server is configured to select the category information corresponding to the category selection information received from the advertisement providing application,
wherein the advertisement providing server is configured to provide the advertisement in relation with the selected category information to the user terminal, wherein the advertisement providing application is configured to provide an advertisement content associated with the advertisement displayed on the display of the user terminal if an advertisement content request input is received by a user for the advertisement displayed on the display of the user terminal, wherein the advertisement providing server is configured to provide a first reward to the user terminal if the user terminal receives the advertisement content request input making a request to provide the advertisement content associated with the advertisement, wherein the advertisement providing server is configured to provide a second reward to the user terminal if the advertisement is displayed on the display of the user terminal by the activation request input making a request to change a state of a display unit of the user terminal from being off to being on, wherein the first reward caused by the advertisement content request input is greater than the second reward caused by the activation request input, wherein the advertisement providing application is configured to accumulate the first reward, the second reward, or both into an accumulated reward, and wherein the user terminal is configured to contribute the accumulated reward to a specific charity or sponsor designated from a charity or sponsor list provided by the advertisement providing server.

2. The system according to claim 1, wherein the advertisement providing server provides the advertisement to the user terminal if the user terminal receives the activation request input from a user.

3. The system according claim 1, wherein the advertisement providing application is configured to provide a time information to the advertisement providing server, wherein the time information comprises when the activation request input is received by the user terminal, wherein the advertisement providing server is configured to store the received advertisement from the advertiser in relation with a specific time information to be displayed on the display of the user terminal, wherein the advertisement providing server is configured to select the specific time information corresponding to the time information received from the advertisement providing application, and wherein the advertisement providing server is configured to provide the advertisement in relation with the selected specific time information to the user terminal.

4. The system according to claim 1, wherein the advertisement providing server is configured to provide a specific time information and an advertisement in relation with the specific time information, and wherein the advertisement providing application is configured to display the advertisement in relation with the specific time information on the display of the user terminal if the user terminal receives the activation request input at the time corresponding to the specific time information.

5. The system according to claim 1, wherein the advertisement content comprises at least one selected from the group consisting of detailed information about an advertised item, promotional information of an advertised brand, a web page of an advertised brand, and a web page for purchasing an advertised item.

6. The system according to claim 1, wherein the advertisement content request input comprises one of a click input to the advertisement displayed on the display of the user terminal or a lock release requesting input to the user terminal.

7. The system according to claim 6, wherein the advertisement providing application is configured to provide the advertisement content on a standby screen if the advertisement content request input is the lock release requesting input, the standby screen being an unlocked state of the user terminal.

8. The system according to claim 1, wherein the advertisement providing server is configured to provide the advertisement content associated with the advertisement displayed on the display of the user terminal if the user terminal receives the advertisement content request input.

9. The system according to claim 1, wherein the advertisement providing application is configured to allow the user to select and designate a number of contacts among acquaintances included in a contact list of the user terminal and transmit a part of the accumulated reward for the user terminal to an acquaintance's terminal corresponding to a selected contact to provide the transmitted part of the accumulated reward, and thus share the accumulated reward with the selected contact, and wherein the number of contacts is initially a predetermined number, and the advertisement providing application is configured such that it is necessary for the user to purchase a license in order to share the reward with more than the predetermined number of contacts.

\* \* \* \* \*